United States Patent [19]

Tominaga et al.

[11] Patent Number: 4,975,721
[45] Date of Patent: Dec. 4, 1990

[54] ELECTRONIC CIRCUITRY FOR PHOTOGRAPHIC CAMERA

[75] Inventors: Shinji Tominaga, Osaka; Kouji Yamamoto; Akira Yamanaka, both of Sakai, all of Japan

[73] Assignee: Minolta Camera Kabushiki Kaisha, Osaka, Japan

[21] Appl. No.: 492,297

[22] Filed: Feb. 28, 1990

Related U.S. Application Data

[60] Continuation of Ser. No. 199,199, May 26, 1988, abandoned, which is a division of Ser. No. 934,637, Nov. 25, 1986, Pat. No. 4,760,414.

[30] Foreign Application Priority Data

Nov. 26, 1985 [JP] Japan .................................. 60-181763
Feb. 12, 1986 [JP] Japan .................................. 61-18998
Feb. 12, 1986 [JP] Japan .................................. 61-18999

[51] Int. Cl.⁵ .................. G03B 15/05; G03B 17/26
[52] U.S. Cl. .................................. 354/127.1; 354/484
[58] Field of Search ............... 354/400, 402, 413, 412, 354/418, 484, 127.1, 127.11, 127.12, 173.1, 173.11, 145.1, 237, 238.1, 266; 315/241 P

[56] References Cited

U.S. PATENT DOCUMENTS

| | | | |
|---|---|---|---|
| 3,846,812 | 11/1974 | Biber | 354/145.1 |
| 4,001,640 | 1/1977 | Biber | 354/145.1 |
| 4,201,463 | 5/1980 | Harigaya et al. | 354/145.1 X |
| 4,426,144 | 1/1984 | Kawazoe | 354/145.1 |
| 4,469,990 | 9/1984 | Maruyama et al. | 315/241 P |
| 4,470,684 | 9/1984 | Harvey | 354/413 |
| 4,550,996 | 11/1985 | Taniguchi et al. | 354/416 |

*Primary Examiner*—W. B. Perkey
*Attorney, Agent, or Firm*—Burns, Doane, Swecker & Mathis

[57] ABSTRACT

An electronic circuitry for a photographic camera including functioning circuits for carrying out various functions of the camera, an electronic flash circuit having at least a voltage boosting circuit and a capacitor which charges the output of the voltage boosting circuit for flash, a control circuit for outputting control signals to the functioning circuits and to the electronic flash circuit and a battery for supplying power to the functioning circuits, the electronic flash circuit and the control circuit. In order to prevent erroneous functions of the functioning circuits caused by noise, the control circuit inhibits the output of the control signals to the functioning circuits while the capacitor for the flashing included in the electronic flash circuit is being charged.

3 Claims, 13 Drawing Sheets

ELECTRONIC CIRCUITRY FOR PHOTOGRAPHIC CAMERA

This application is a continuation of application Ser. No. 07/199,199, filed May 26, 1988, now abandoned which is a divisional of application Ser. No. 06/934,637, filed on Nov. 25, 1986, now U.S. Pat. No. 4,760,414.

BACKGROUND OF THE INVENTION

1. Field of the Invention

The present invention relates to an electronic circuitry for a photographic camera, and more particularly to a control circuitry for controlling the operations of various circuits incorporated in the camera.

2. Description of the Prior Art

Many of recent photographic cameras are provided with various electronic circuitries and a battery for supplying power thereto. And, as functions of the camera are electronically carried out, functioning circuits such as an automatic exposure control circuit, an automatic focusing circuit, a driving, circuit for a motor for winding-up and rewinding a film and a large load circuit such as an electronic flash circuit and the like are incorporated in the camera.

However, when the large load circuit and the functioning circuits are operated simultaneously, noise induced or caused by the operation of the large load circuit is erroneously input to the functioning circuits or the potential of a control signal for the operation of the functioning circuits is erroneously changed due to the drop of the power supply voltage caused by the operation of the large load circuit and there sometimes occurs misfunctioning of the circuits. For this reason, there have been disclosed various systems which inhibit the large load circuit and the functioning circuits from the simultaneous operations thereof. For instance, U.S. Pat. No. 3,917,395 teaches an electronic circuitry for a photographic camera including a switch for selectively connecting an oscillator for an electronic flashing device and the automatic exposure control circuit to a power supply device. According to this system, however, the electronic flash circuit and the automatic exposure control circuit being selectively operated, while the switch is selected for supplying the power to the electronic flash device, it is impossible to control the other functions of the camera, whereby a rapid photographic operation is difficult.

SUMMARY OF THE INVENTION

Therefore, it is an object of the present invention to provide an electronic circuitry comprising a control circuit for controlling timings for activating a large load circuit such as an electronic flash circuit and for activating the functioning circuits such as an automatic exposure control circuit, an automatic focusing circuit and the like.

In order to accomplish the above object, the electronic circuitry for a photographic camera as an embodiment of the present invention comprises functioning circuit means for carrying out various functions of a camera, an electronic flash circuit including at least a voltage boosting circuit and a capacitor which charges the output of the voltage boosting circuit for flashing, a control circuit for outputting control signals to the functioning circuit means and to the electronic flash circuit and power supply means for commonly supplying power to the functioning circuit means, the electronic flash circuit and the control circuit. The control circuit inhibits the output of the control signals to the functioning circuit means while the capacitor for flashing included in the electronic flash circuit is being charged.

It is another object of the present invention to provide an electronic circuitry for a photographic camera including a control circuit for controlling the timings for activating the large load circuit such as the electronic flash circuit and for activating the functioning circuits such as the automatic exposure control circuit and the automatic focusing circuit in response to a time lapse of a voltage boosting operation of the electronic flash circuit.

In order to acccomplish this object, the electronic circuitry for a photographic camera as another embodiment of the present invention comprises functioning circuit means for carrying out various functions of a camera, an electronic flash circuit including at least a voltage boosting circuit and a capacitor which charges the output of the voltage boosting circuit for flash, a control circuit for outputting control signals to the functioning circuit means and to the electronic flash circuit, power supply means for the functioning circuit means and for the electronic flash circuit and time measuring means for starting a time measuring operation in response to a start of voltage boosting operation of the electronic flash circuit and then for outputting a time-up signal to the control circuit after a predetermined time lapse. The control circuit inhibits the output of the control signals to the functioning circuit means until receiving the time-up signal from the time measuring means.

BRIEF DESCRIPTION OF THE DRAWINGS

The accompanying drawings illustrate embodiments of the present invention, in which.

DESCRIPTION OF THE PREFERRED EMBODIMENTS

Figure 1:
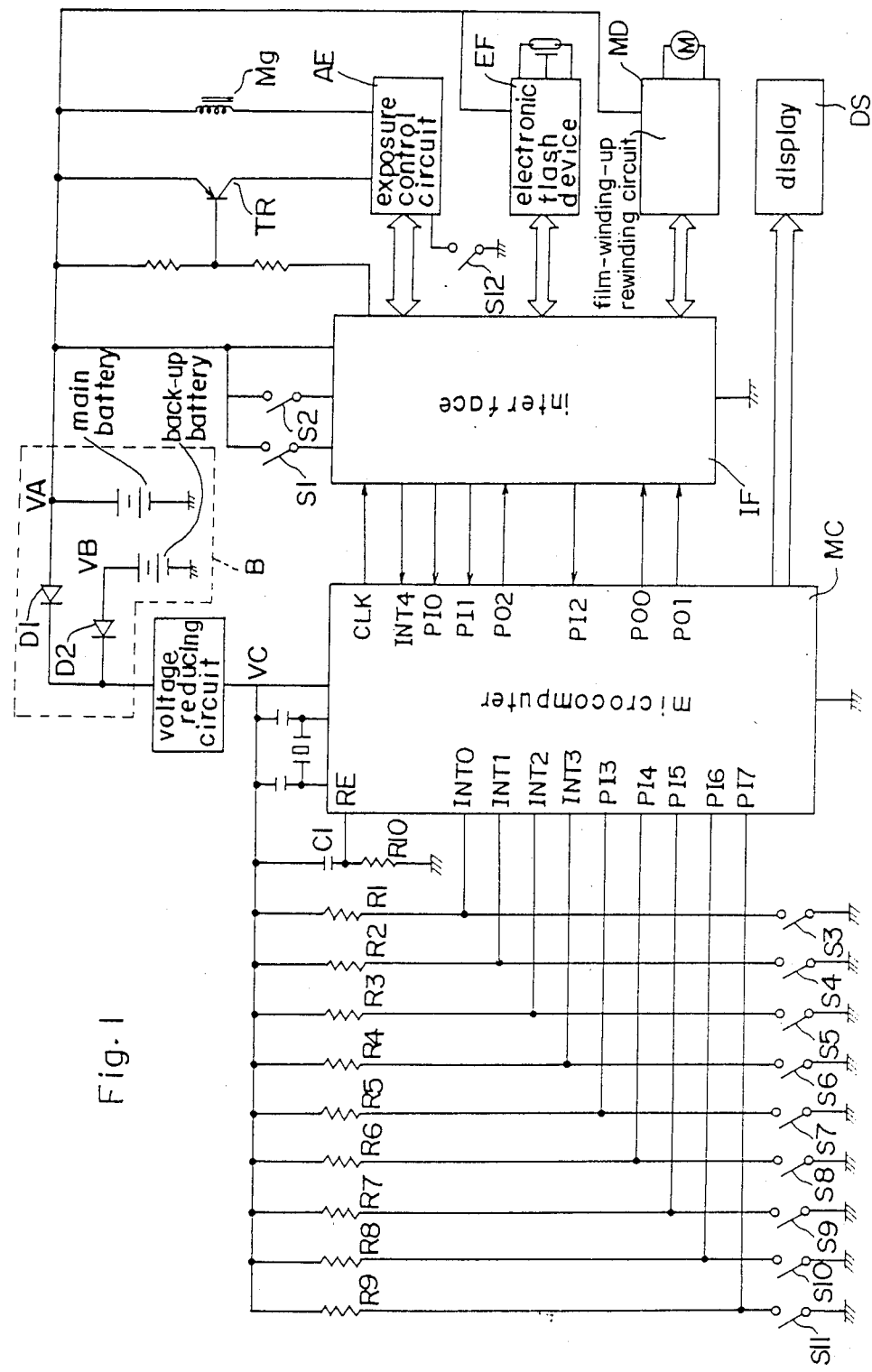
FIG. 1 is a block diagram showing an overall construction of an electronic circuitry of an embodiment of the present invention.
Figure 2:
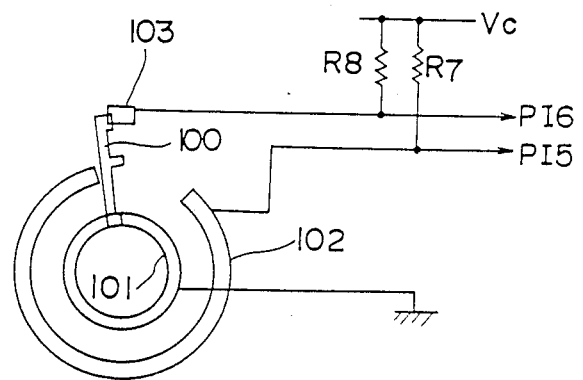
FIG. 2 is a schematic view showing constructions of a one-frame winding proceeding switch S9 and of a one-frame winding completion switch S10 of FIG. 1.

An embodiment of the present invention as applied to a photographic camera system incorporating an electronic flash device and a film windingup/rewinding device will be particularly described hereinafter with reference to the accompanying drawings. FIG. 1 is a block diagram showing an overall circuitry construction of this photographic camera system. The photographic camera system essentially comprises a power supply section B, a microcomputer MC, an interface circuit section IF, a display section DS, an exposure control circuit AE, the electronic flash device EF and a film windingup/rewinding circuit MD.

Referring more particularly to the power supply section B, a main battery BA, which is a battery having a relatively large capacity such as a manganese battery, an alkaline-manganese battery or a lithium battery, supplies power directly to the interface circuit section IF, the exposure control circuit AE, the electronic flash device EF and to the film winding-up/rewinding circuit MD. A voltage reducing circuit DV receives a power supply of voltage Va or Vb respectively from the main battery BA or a back-up battery BB through a diode D1 or a diode D2 and then reduces the voltage Va or Vb to a predetermined voltage value Vc to supply the same to the microcomputer MC. The back-up battery BB is disposed parallel to the main battery BA thereby to maintain the microcomputer MC energized in place of the main battery BA when the power source voltage supplied by the main battery BA drops down to a predetermined value or when the main battery BA is unloaded for a replacement. The voltage reducing circuit DV functions as a constant voltage circuit for reducing the power source voltages supplied by the main battery BA or the back-up battery BB to the voltage Vc (1.5 V for example) which is required for a normal operation of the microcomputer MC.

Switches S1 and S2 are closed respectively when a shutter button is depressed. When the shutter button is depressed to its first stroke, only the switch S1 is closed; whereas, when the same is depressed to its second stroke, both switches S1 and S2 are closed. Signals provided with the closure of these switches are output through the interface circuit section IF to the microcomputer MC and to the exposure control circuit AE. Then, in response to the closure of the switch S1 range-finding and light measuring operations are started, and in response to the closure of the switch S2 a shutter release operation is started. It is noted that the signal provided in response to the closure of the light measuring switch S1 is output to an input terminal INT4 of the microcomputer MC whereby the microcomputer MC starts a light measuring interruption routine INTP to be described later.

A switch S3 is a back lid switch which is closed when a back lid (not shown) of the camera is opened and which is opened when the back lid is closed. This switch S3 has its one terminal grounded and the other terminal connected to an interruption terminal INT0 of the microcomputer MC. A switch S4 is an inner lid switch adapted to respond to opening and closing operations of an inner lid (not shown) for an automatic initial film loading which is disposed to face a spool or a sprocket of the camera. The inner lid is disclosed for example in a Japanese patent application laid open under No. 58-23022 or a U.S. Pat. No. 4,477,162. This switch S4 is closed when the inner lid is opened and is opened when the inner lid is closed. This switch S4 has its one terminal grounded and the other terminal connected to an interruption terminal INT1 of the microcomputer MC. It is to be noted that this inner lid is adapted to be opened simultaneously with the opening of the back lid. A switch S5 is a rewinding switch which is closed when the film rewinding operation is to be started and has its one terminal grounded and the other terminal connected to an interruption terminal INT2 of the microcomputer MC. It is to be noted that this switch S5 is closed when a film winding-up mechanism (not shown) detects impossibility of further winding-up operation as the last frame of the film has been exposed or when a film rewinding operational member (also not shown) is operated by an operator. A switch S6 is a main battery switch which is disposed in a main battery compartment and which is opened when the main battery BA is loaded therein and is closed when the main battery BA is not loaded therein. This switch S6 has its one terminal grounded and the other terminal connected to an interruption terminal INT3 of the microcomputer MC.

In response to the changes of states of the above switches S3 through S6, i.e. from the opened state to the closed state or from the closed state to the opened state, the microcomputer MC carries out a switch interruption routine INTA to be described later.

A switch S7 is a film presence detection switch for detecting whether the film is loaded or not and which is closed with the presence of the film at a predetermined position and is opened with the absence thereof. This switch S7 has its one terminal grounded and the other terminal connected to an input terminal PI3 of the microcomputer MC. More particularly, by this switch S7 it is detected whether the film, at least a tip of the film, is placed in spool chamber side of the camera or not. A switch S8 is a photography mode switch which is closed when a self-timer photography mode is selected by a self-timer operational member (not shown) and which is opened when a normal photography mode is selected. This switch S8 has its one terminal grounded and the other terminal connected to an input terminal PI4 of the microcomputer MC. A switch S9 is a one-frame-winding proceeding switch which is operatively connected with a film winding-up mechanism (not shown) such that the switch S9 is closed with a start of one-frame film winding-up operation and is opened immediately before a completion thereof. This switch S9 has its one terminal grounded and the other terminal connected to an input terminal PI5 of the microcomputer MC. A switch S10 is a one-frame-winding completion switch which is operatively connected with the film winding-up mechanism such that the switch S10 is closed in response to a completion of the one-frame film winding-up operation. This switch S10 has its one terminal grounded and the other terminal connected to an input terminal PI6 of the microcomputer MC. That is to say, by the switch S9 it is detected whether the one-frame film winding-up operation is being carried out or not, and by the switch S10 it is detected whether the one-frame film winding-up operation has been completed or not. A switch S11 is a film advance detection switch which is repeatedly opened and closed in response to a predetermined amount of film advance. This switch S11 has its one terminal grounded and the other terminal connected to an input terminal PI7 of the microcomputer MC. More particularly, this switch S11 is operatively connected with a driven sprocket (not shown) driven and rotated in response to the film advance for instance such that the switch S11 repeats opened and closed states four times when the film is advanced by one-frame length. It is to be noted that this switch S11 may be formed not only as a mechanical switch but also as an electronic switch which photoelectrically or electromagnetically detects whether the film is being advanced or not. A switch S12 is an exposure completion switch which is opened in response to a completion of a shutter charging operation and is closed in response to a completion of an exposure operation of the exposure control circuit AE. This switch S12 has its one terminal grounded and the other terminal connected to the exposure control circuit AE.

The constructions of the switches S9 and S10 will be more particularly described next with reference to FIG.

2. A sliding brush 100 is operatively connected with the film winding-up mechanism so as to be rotated clockwise by one turn each time the film is wound-up by one-frame length. This brush 100 rotates on a sliding track thereof and selectively comes into contact with contact points 102 and 103. A common contact 101, the contact 102 and the brush 100 constitute the switch S9, whereas the common contact 101, the contact 103 and the brush 100 constitute the switch S10. It is to be noted here that the contact 103 is disposed at a position equivalent to the position of the completion of film winding-up operation whereas the contact 102 is disposed on a periphery except the position of the contact 103 and the vicinity thereof. According to this construction, when the film winding-up operation is started, firstly the switch S9 is closed and this closed state of the switch S9 is maintained by the contact 102 immediately before the switch S10 is closed, i.e. the completion of the film winding-up operation. In the case of the film rewinding operation, the brush 100 is rotated counterclockwise. The film winding-up/rewinding circuit MD carries out the film winding-up operation by a normal rotation of a motor M and carries out the film rewinding operation by a reverse rotation of the same. This circuit MD further carries out an inner lid film loading operation which automates the film roll-up operation by rolling up the film to the spool by one-frame length in response to a closure of the inner lid with the tip of the film being placed on a predetermined place, e.g. at the sprocket, and thereafter carries out an initial film loading operation which automatically winds up the film by three-frame length in response to the closure of the back lid and after which normal film exposure is enabled.

Figure 3:
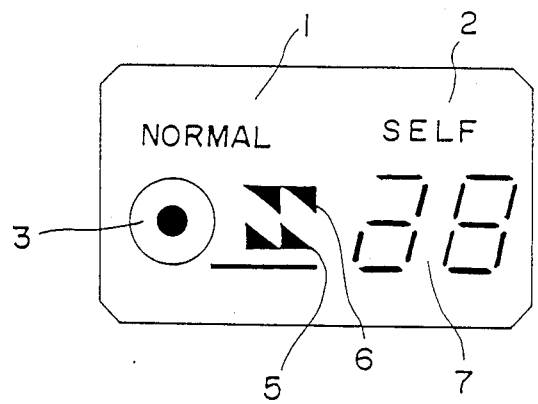
FIG. 3 is an illustration of all segments and marks to be displayed by a display section DS of FIG. 1.

The display section DS is directly controlled by the microcomputer MC and comprises a liquid crystal device and the like. All the segments to be displayed by the display section DS will be described next with reference to FIG. 3.

A character 'NORMAL' 1 and a character 'SELF' 2 show photography modes. The character 'NORMAL°' 1 is displayed in the normal photography mode while the character 'SELF' 2 is displayed in the self-timer photography mode, respectively. A mark 3 is displayed when the film is loaded and placed in the spool chamber side of the camera and triangular marks 5 and 6 are respectively displayed in the film winding-up operation and in the film rewinding operation. A two-digit number 7 denotes a film frame counter for numerically displaying a number of exposed film frames.

The microcomputer MC outputs and inputs signals to and from the interface circuit section IF through a clock pulse output terminal CLK, the interruption terminal INT4, the input terminals PI0 through PI2 and the output terminals PO0 through PO2. More particularly, the microcomputer MC selectively outputs clock pulses of 1 KHz or 4 Hz through the clock pulse output terminal CLK. The microcomputer MC further outputs through the output terminals PO0 and PO1 signals for controlling the film winding-up/rewinding circuit MD, through the output terminal PO2 photography mode designating signal in accordance with the state of the photography mode switch S8.

The microcomputer MC inputs through the interface circuit IF from the interruption terminal INT4 a signal showing the state of the light measuring switch S1, from the input terminal PI0 a signal showing the ongoing exposure operation by the exposure control circuit AE, from the input terminal PI1 a signal showing the battery voltage condition of the main battery BA and from the input terminal PI2 a signal designating the kind of the clock pulses to be output from the clock pulse output terminal CLK, respectively.

Figure 4:
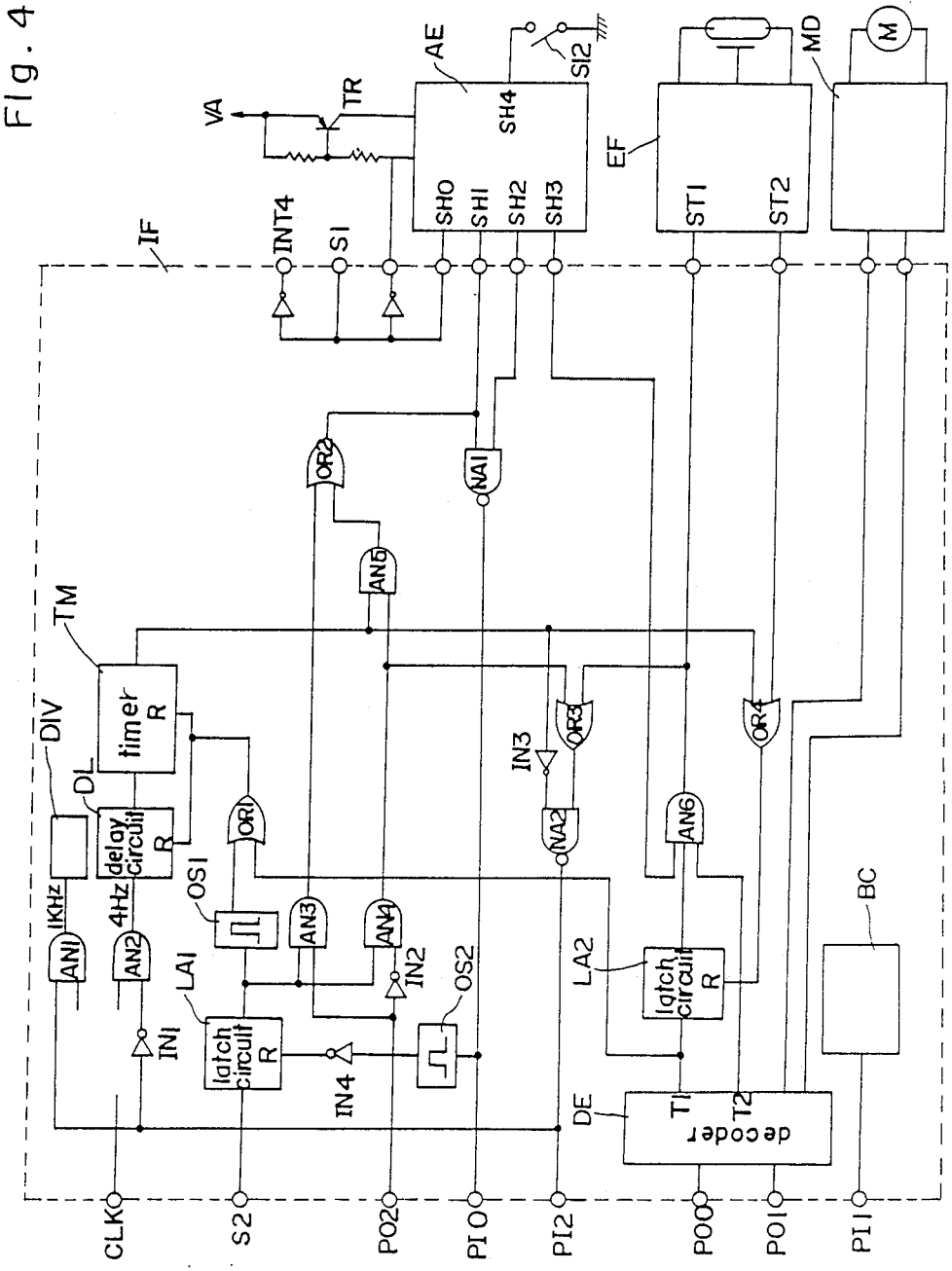
FIG. 4 is a circuit diagram specifically showing a construction of an interface circuit section IF of FIG. 1, and FIGS. 5a through 5e, FIGS. 6a through 6c, FIG. 7 and FIG. 8 flow charts illustrating a functioning of a microcomputer MC of FIG. 1.

FIG. 4 is a circuit diagram showing more specifically a construction of the interface circuit section IF. In this figure, an AND gate AN1 and a divider DIV constitute together with a circuit section for dividing the 1KHz clock pulses from the clock pulse output terminal CLK to output timing control pulses for the exposure control circuit AE. Inverters IN1 and IN3, an AND gate AN2, a delay circuit DL, a timer TM, a NAND gate NA2, a one-shot circuit OS1 and OR gates OR1 and OR3 constitute a circuit section for counting the 4 Hz clock pulses from the clock pulse output terminal CLK and then for outputting timing designating signals for the self-timer mode photography or for a voltage boosting control operation of the electronic flash device EF. A latch circuit LA1, a one-shot circuit OS2, inverters IN2 and IN4, AND gates AN3 through AN5, a NAND gate NA1 and an OR gate OR2 constitute together with a circuit section for outputting a shutter release signal in response to the closure of the shutter-release switch S2. A latch circuit LA2, an AND gate AN6 and an OR gate OR4 constitute together with a circuit section for controlling the voltage boosting operation of the electronic flash device EF. A decoder DE outputs, in response to the signals from the output terminals PO0 and P01 of the microcomputer MC, signals for controlling the operations of the film windingup/rewinding circuit MD and the electronic flash device EF. A battery voltage detection circuit BC detects whether a battery voltage of the main battery BA is currently above a predetermined level or not and then outputs a signal representing the detection to the input terminal PI1 of the microcomputer MC.

Functioning of the interface circuit section IF according to the above-described construction will be described next. Firstly, a condition in which the normal photography mode is selected by the photography mode switch S8 and the output terminal PO2 of the microcomputer MC is in the state of 'H' (high) will be described. In this condition, the AND gate AN3 is unblocked or opened and the AND gate AN4 is blocked or closed. If the light measuring switch S1 is closed, the potential at an input terminal SH0 of the exposure control circuit AE is switched to 'L' (low), an output terminal SH3 is switched to 'L' and an 'L°' signal is output through the AND gate AN6 to an input terminal ST1 of the electronic flash device EF, whereby the voltage boosting operation of the electronic flash device EF is inhibited. Since the AND gate AN4 is closed, the OR gate OR3 outputs an 'L' signal, the NAND gate NA2 outputs an 'H' signal, the NAND gate NA1 is opened and the AND gate AN2 is closed. Receiving the 'H' signal from the NAND gate NA2 through the input terminal PI2, the microcomputer MC outputs the clock pulse output terminal CLK clock pulses of 1 KHz. That is, the 'H' signal from the NAND gate NA2 commands the microcomputer MC to output the clock pulses of 1 KHz. The divider DIV obtains timing pulses by dividing the clock pulses of 1 KH and controls thereby the functioning of the exposure control circuit AE. In this condition, since the gate AN2 is closed, the timer TM is deenergized.

Then, when the shutter-release switch S2 is closed, the latch circuit LA1 outputs an 'H' signal, which is input through the opened AND gate AN3 and through the OR gate OR2 to the input terminal SH1 of the exposure control circuit AE. In response to the input of this 'H' signal, the exposure control circuit AE starts the shutter release operation and at the same time switches the output terminal SH2 to 'H'. This output terminal SH2 is switched to 'L' as the exposure completion switch S12 is closed with a completion of the exposure operation, i.e. the output terminal SH2 is in the state of 'H' only in the course of the exposure control operation, thus the NAND gate NA1 outputs an 'L' signal only in the course of said operation. This 'L' signal is input as an exposure operation proceeding signal to the input terminal PI0 of the microcomputer MC. Further, with the completion of the exposure operation, the NAND gate NA1 outputs an 'H' signal to energize the one-shot circuit OS2 which in turn resets the latch circuit LA1.

When the microcomputer MC detects the completion of the exposure operation as the input terminal PI0 is switched from 'L' to 'H', the microcomputer MC outputs film winding-up signals through the output terminals PO0 and P01 to the decoder DE. Then, the decoder DE decodes the signals and outputs signals commanding a normal rotation of the motor M to the film winding-up/rewinding circuit MD and at the same time outputs an 'L' signal to the AND gate AN6 through an output terminal T2, whereby an 'L' signal is input to an input terminal ST1 of the electronic flash device EF and the voltage boosting operation of the electronic flash device EF is inhibited while the motor M is driven. Detecting through the switches S9 and S10 that the film is normally wound up by the one-frame length, the microcomputer MC outputs motor stop signals through the output terminals PO0 and P01. The decoder DE outputs to the film winding-up/rewinding circuit MD signals for short-circuiting terminals of the motor M and at the same time outputs an 'H' signal through an output terminal T1. Thereby, the signal output from the latch circuit LA2 is switched to 'H' and at the same time the delay circuit DL and the timer TM are reset through the OR gate OR1. It is to be noted here that this delay circuit DL is provided for preventing unnecessary 1 KHz clock pulses from being input to the timer TM when the output clock pulses are switched from 1 KHz to 4 Hz.

Also, the output terminal T2 of the decoder DE is switched to 'H'. In this condition, since the output terminal SH3 of the exposure control circuit AE is in the state of 'H' if the light measuring switch S1 is opened, the AND gate AN6 outputs an 'H' signal whereby the electronic flash device EF starts the voltage boosting operation and at the same time, by the 'H' signal from the OR gate OR3 and by the resetting of the timer TM, the signal from the NAND gate NA2 is reversed to 'L'.

This reversed 'L' signal from the NAND gate NA2 is input as a clock pulse switch signal through the input terminal PI2 to the microcomputer MC whereby the microcomputer MC outputs 4 Hz clock pulses through the clock pulse output terminal CLK. Simultaneously therewith, the AND gate AN2 is opened and the timer TM starts counting the 4 Hz clock pulses input through the clock pulse output terminal CLK of the microcomputer MC. Then, when the timer TM has counted up 10 thereby to output an 'H' signal or when the power charging operation of the electronic flash device EF has been completed thereby to switch its output terminal ST2 to 'H', at an earlier timing therebetween, an 'H' signal is output from the OR gate OR4 to reset the latch circuit LA2, whereby the AND gate AN6 outputs an 'L' signal to inhibit the voltage boosting operation of the electronic flash device EF. At the same time, the NAND gate NA2 outputs an 'H' signal which is input through the input terminal PI2 to the microcomputer MC to output 1 KHz clock pulses therefrom and also the AND gate AN1 is opened and the AND gate AN2 is closed.

Nextly, a condition in which the self-timer photography mode is selected and the output terminal PO2 of the microcomputer MC is in the state of 'L' will be described. In this case, since the AND gate AN4 is opened and the AND gate AN3 is closed, even if the AND gate AN4 outputs an 'H' signal as the shutter-release switch S2 is closed, the signal output from the AND gate AN5 is maintained in the 'L' until the timer TM outputs an 'H' signal. Also, the 'H' signal from the AND gate AN4 goes through the OR gate OR3 and the NAND gate NA2 outputs an 'L' signal to command the microcomputer MC through the input terminal PI2 to output 4 Hz clock pulses through the clock pulse output terminal CLK. At the same time, the AND gate AN2 is opened and the timer TM starts counting the 4 Hz clock pulses. Then, having counted up 10 seconds, the timer TM outputs an 'H' signal. This 'H' signal output from the timer TM causes the AND gate AN5 to output an 'H' signal and the OR gate OR2 also outputs an 'H' signal to be input through the input terminal SH1 to the exposure control circuit AE, whereby the exposure control circuit AE starts the shutter release operation 10 seconds after the closure of the shutter-release switch S2. The following functioning of the circuit is the same as in the case of the normal photography mode, thus will not be described.

Functioning of the microcomputer MC will be particularly described with reference to a flow chart shown in FIGS. 5 through 8. FIGS. 5a through 5e show a main flow of the microcomputer MC and FIGS. 6 through 8 respectively show a switch interruption routine INTA by the switches S3 through S6, a divider interruption routine INTD for permitting the divider incorporated in the microcomputer MC to count the predetermined time period and a blinking interruption routine INTT for permitting the timer incorporated in the microcomputer MC to carry out blinking display operation by the display section DS.

Figure 5A:
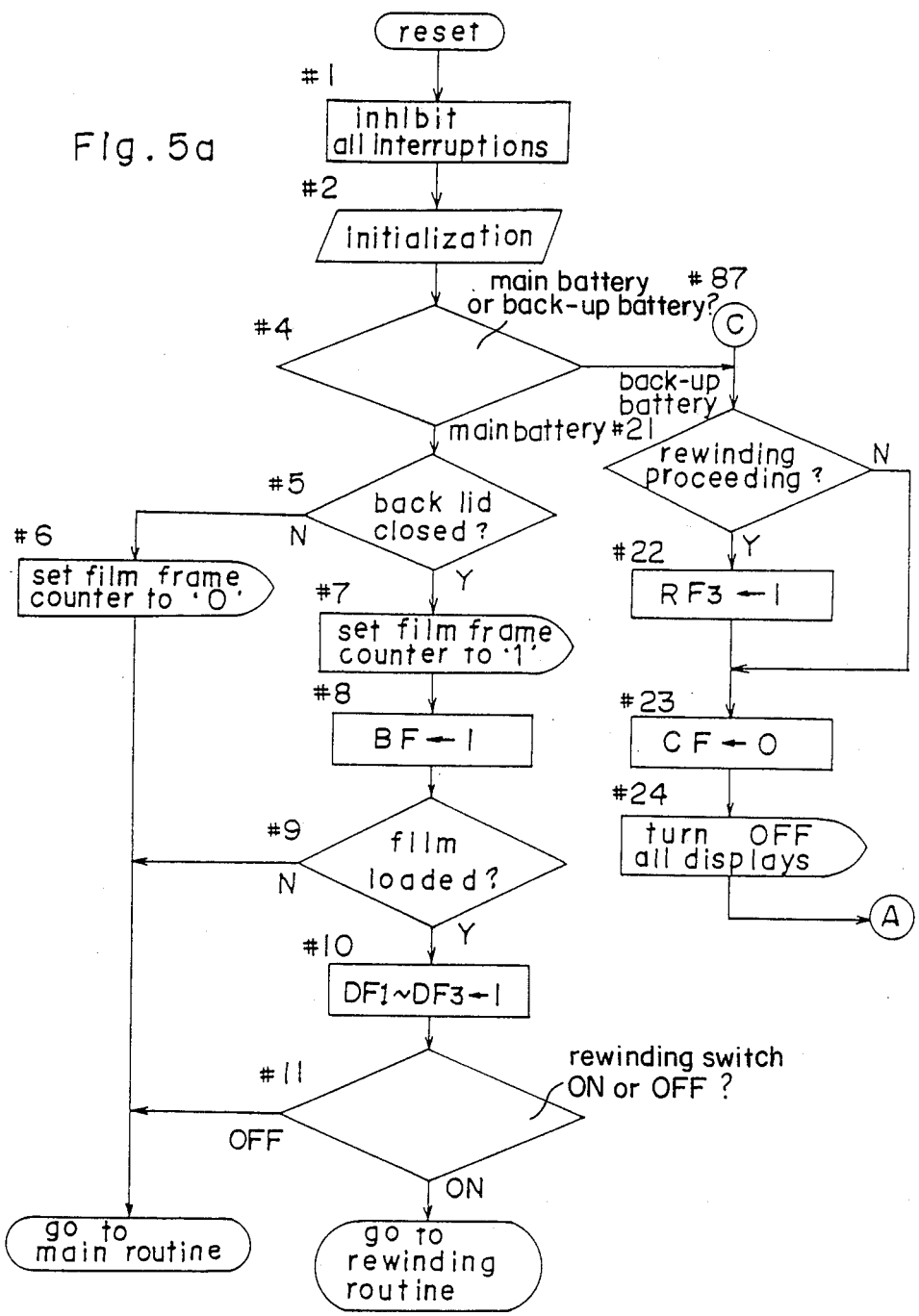
Figure 5B:
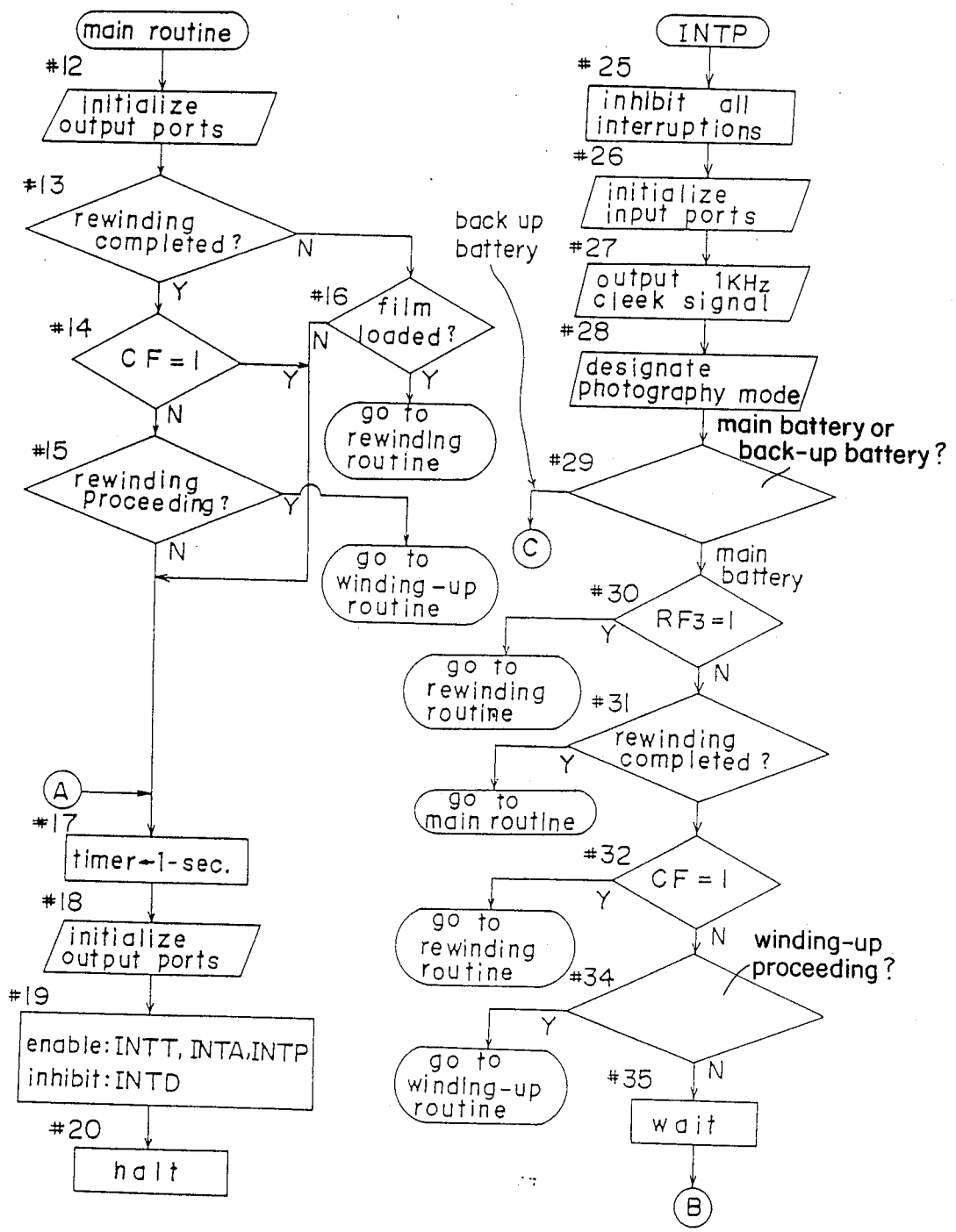
Figure 5C:
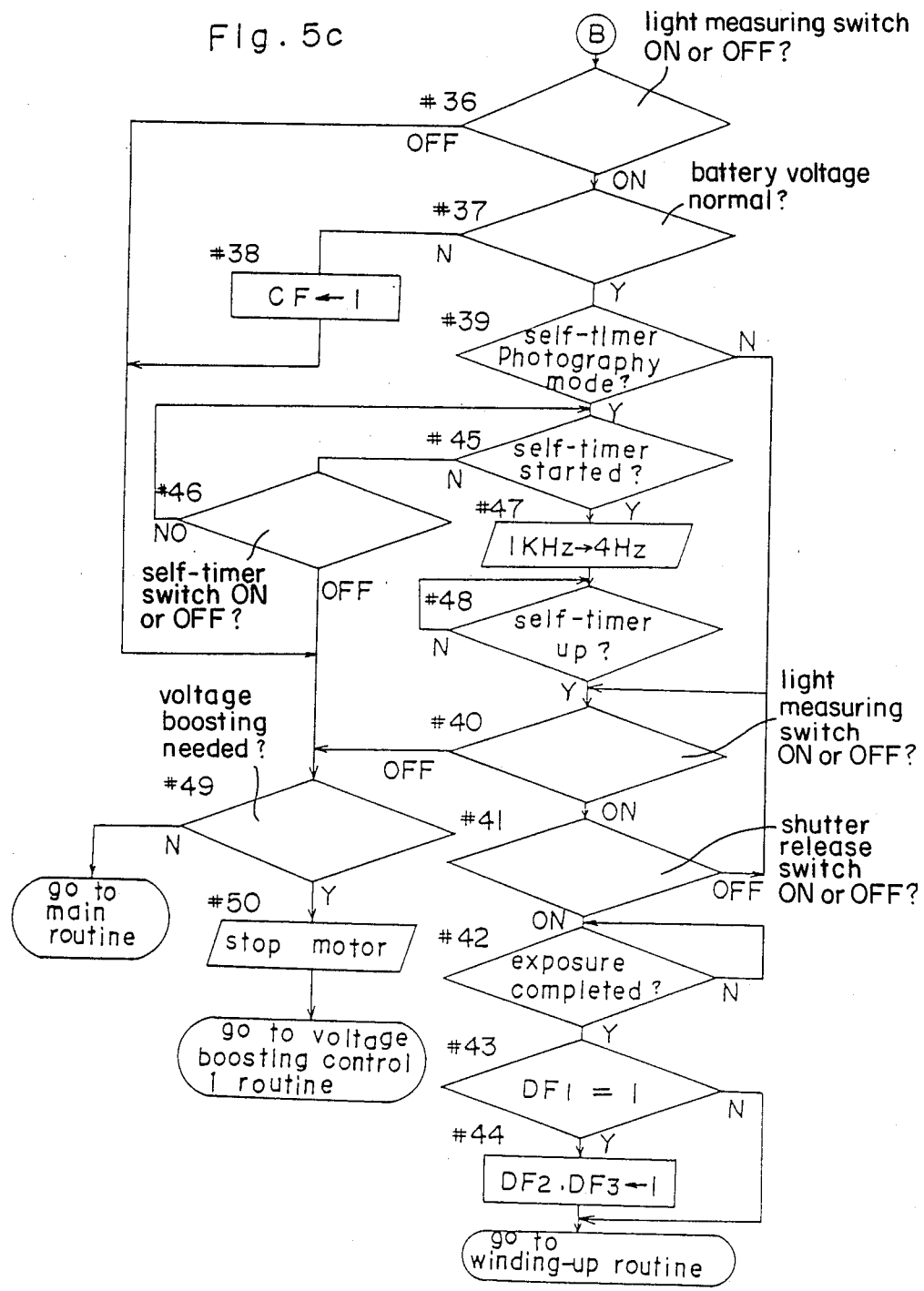
Figure 5D:
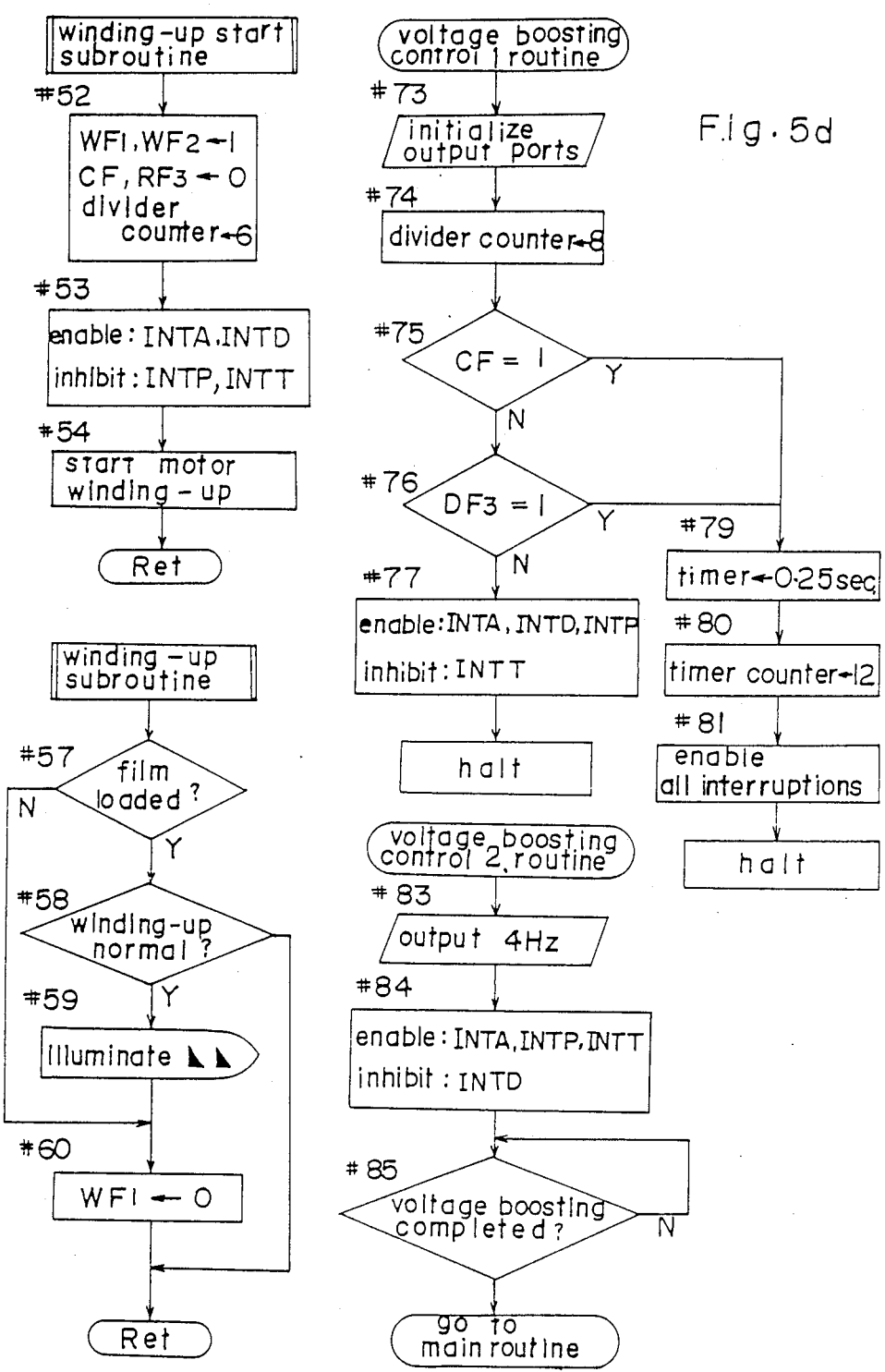
Figure 5E:
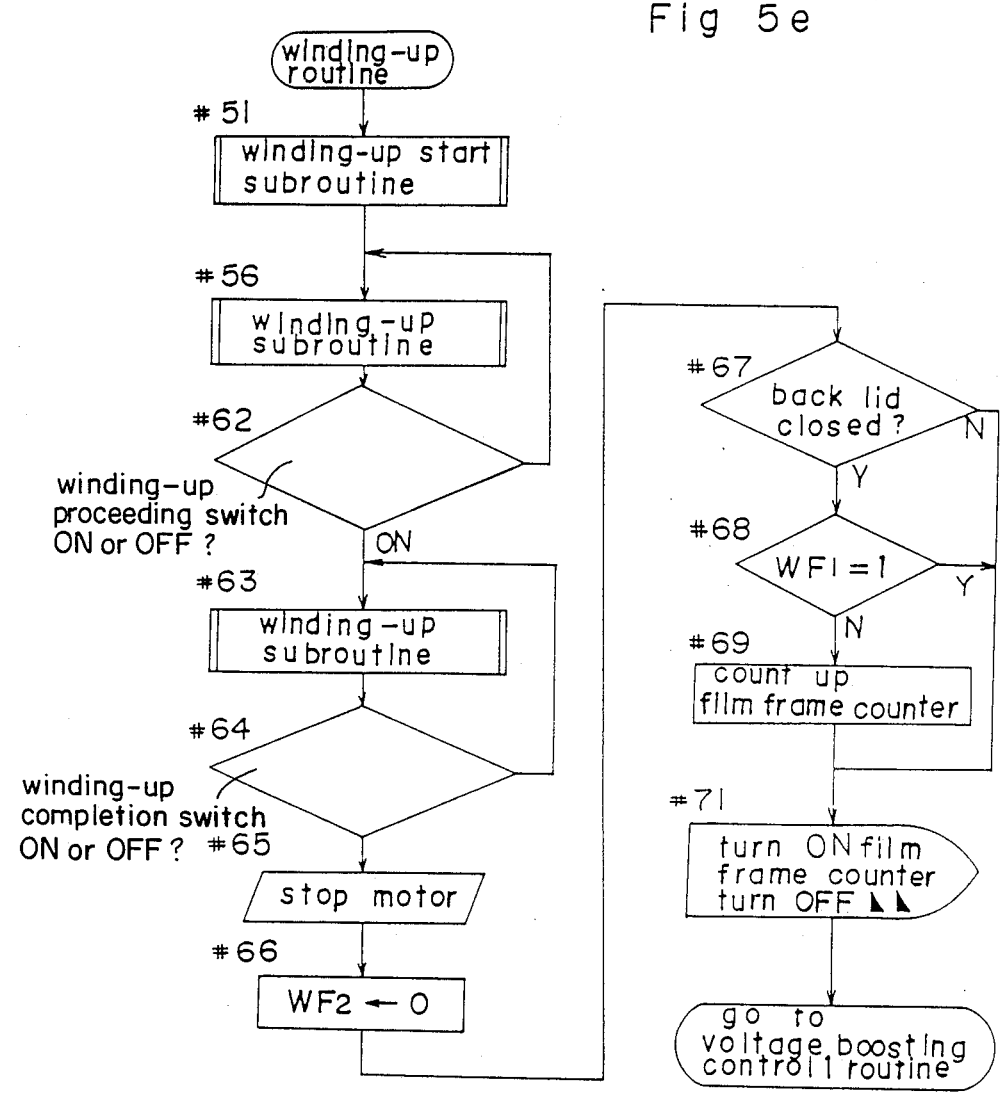

In the absence of both the back-up battery BB and the main battery BA, if either of said batteries is loaded into the camera, a reset terminal RE of the microcomputer MC is instantly switched to 'H', whereby the microcomputer MC starts a reset routine beginning at step #1 shown in FIG. 5a. At step #1, all the interruptions are inhibited and at steps #2 and #3 the input and output ports and the integrated memory are initialized. At step #4, it is judged from the state of the switch S6 whether the presently loaded battery is the main battery BA or the back-up battery BB. If it is judged that the presently loaded battery is the main battery BA, it is judged at step #5 from the state of the switch S3 whether the back lid is closed or not. If it is judged that the back lid is opened, the frame number display value on the film frame counter 7 of the display section DS is set to '0' at step #6 and then the process jumps to the main routine beginning at step #12.

On the other hand, if it is judged at step #5 that the back lid is closed, the frame number display value on the film frame counter 7 is set to '1' at step #7 and a back lid flag BF is set thereby to store the closure of the back lid at step #8. At step #9, it is judged from the state of the switch S7 whether the film is placed in the spool chamber side or not. If it is judged that the film is not placed therein, the process jumps to the main routine. On the other hand, if it is judged that the film is placed therein, display flags DF1 through DF3 for providing warning displays for resetting film data about a film speed, a film frame number and the like are respectively set at step #10. Referring more specifically to each of these flags DF1 through DF3, the flag DF1 is set in the reset routine when the film is placed in the spool chamber side with the main battery BA loaded. The flag DF2 is a film frame counter display flag which is set for permitting the display section DS to display the film frame number value. The flag DF3 is a film frame counter blinking flag which is set for blinking the film frame counter of the display section DS. It is to be noted that the aforementioned warning displays for resetting the film data are prosecuted after the completion of film winding-up operation. At step #11, it is judged whether the rewinding switch S5 is closed or not. If it is judged that this rewinding switch S5 is opened, the process jumps to the main routine; whereas, if it is judged that the switch S5 is closed, the process jumps to the film rewinding routine.

Referring now to the main routine, at step #12 the output ports are initialized and at steps #13 through #16 the rewinding operation completion condition, the battery voltage condition of the main battery BA, the winding-up operation proceeding condition and the presence or the absence of the film are respectively judged. More particularly, the rewinding operation completion condition is judged from the state of a rewinding flag RF2 which is set with a completion of rewinding operation. The battery voltage condition is judged from the state of a battery check flag CF (will be briefly referred to as BC flag CF hereinafter) which is set when the film winding-up or the film rewinding operation has taken longer time than the predetermined time period because of a reduced battery voltage. The winding-up operation proceeding condition is judged from the state of the one-frame winding proceeding switch S9. The presence or the absence of the film is judged from the state of the film presence detection switch S7. If it is judged that the film rewinding operation has been completed and that the film is placed in the spool chamber side, the process jumps to the film rewinding routine beginning at step #119 to be described later. On the other hand, if it is judged that the film rewinding operation has been completed and that the film is not placed in the spool chamber side, or if the film rewinding operation has not yet been completed and that the battery voltage has been reduced below the predetermined value, or if it is judged that the film rewinding operation has not yet been completed and that the battery voltage is above the predetermined value and that the film winding-up operation is not under way, the process jumps to step #17. If it is judged that the film rewinding operation has not yet been completed and that the battery voltage is above the predetermined value and that the film winding-up operation is presently under way, the process jumps to the film winding-up routine beginning at step #51 to be described later.

At step #17, the incorporated timer of the microcomputer MC for the blinking display is set to 1 second. It is to be noted that if the BC flag CF is set, the timer is set to 0.25 second at the same step. At step #18, the output ports are set to 'L' in order to save power consumption. At step #19, the light measuring interruption INTP, the switch interruption INTA and the blinking interruption INTT are enabled and the divider interruption INTD is inhibited, and then the process comes to halt at step #20.

The flow covered by steps #21 through #24 illustrates the functioning in case only the back-up battery BB is loaded with the absence of the main battery BA. This flow is provided since the back-up battery BB having only a small power capacity is not capable of carrying out a normal motor driving operation nor a normal voltage boosting operation. More particularly, if it is judged at step #4 that the back-up battery BB is loaded, the process jumps to step #21, resets the BC flag CF at step #23, provides the warning display at step #24 which shows that the main battery BA is not loaded and then jumps to step #17 to come to halt. Also, if it is judged at step #87 that the main battery BA is unloaded after both the main battery BA and the back-up battery BB are loaded, the process jumps to the flow beginning at step #21. If it is judged that the film rewinding operation is presently under way, a film rewinding proceeding flag RF3 is set and it is stored at step #22 that the unloading operation of the main battery BA has taken place in the course of the film rewinding operation. As this film rewinding flag RF3 is set, the film rewinding operation is given priority to be completed at step #140 when the main battery BA is replaced.

When the light measuring switch S1 is closed, the interface circuit IF energizes the transistor TR thereby to supply the power Vd to the exposure control circuit AE. Also, the interruption terminal INT4 of the microcomputer MC is switched to 'L', whereby the microcomputer MC comes out of the halt to carry out the light measuring interruption routine INTP. At step #25, all the interruptions are inhibited and the input ports are initialized at step #26. At step #27, the microcomputer MC outputs 1 KHz clock pulses through the clock pulse output terminal CLK. In response to the 1 KHz clock pulses, the interface circuit IF carries out its predetermined sequence.

At step #28, the microcomputer MC outputs through the output terminal PO2 an 'H' signal in case of the normal photography mode and an 'L' signal in case of the self-timer photography mode respectively from the state of the photography mode switch S8. At step #29, it is judged from the state of the main battery switch S6 whether the main battery BA is loaded or not. If it is judged at this step that the main battery BA is not loaded (i.e. only the back-up battery BB is loaded), the process jumps to the aforementioned step #21. On the other hand, if it is judged at the same step that the main battery is loaded, it is judged at steps #30 through #33 whether the film rewinding operation is presently under way or not. More particularly, at step #30 it is judged from the state of the flag RF3 whether the unloading of the main battery BA has taken place in the course of the film rewinding operation or not. In the case of the affirmative judgement, the process goes on to the film rewinding routine. On the other hand, in the case of the negative judgement, it is judged at step #31 whether the film rewinding operation has been completed or not. If completed, the process goes on to the main routine; while, if not completed, it is judged at step #32 whether the BC flag CF is set or not. If it is judged that the BC flag is set, this means that the battery power has been reduced in the course of the film rewinding operation, thus the process goes on to the film rewinding routine.

If it is judged at the same step that the film rewinding operation is not presently under way, the process goes on to step #34 to judge from the state of the switch S9 or S10 whether the film winding-up operation is presently under way or not. In the case of the affirmative judgement, the process jumps to step #51 to carry out the film winding-up routine thereby to drive the motor to place the film winding-up mechanism to the proper winding-up completion position. On the other hand, if the film winding-up operation is completed, the process waits for a battery condition check signal from the interface circuit IF at step #35. At step #36, the state of the light measuring switch S1 is again judged. If it is judged that this light measuring switch S1 is opened, the process jumps to step #49 without carrying out the shutter release routine beginning at step #41. Also, even if it is judged that the light measuring switch S1 is closed, and if it is judged at step #37 from the state of the battery condition check signal that the battery voltage has been reduced, the BC flag CF is set at step #38 and then the process jumps to step #49.

If the photometirc switch S1 is closed and the battery voltage is above the predetermined value, the state of the photography mode switch S8 is judged. If it is judged that the presently selected mode is the normal photography mode, the process jumps to step #40. On the other hand, if it is judged that the presently selected mode is the self-timer photography mode, the process jumps to step #40 after carrying out a self-timer photography routine at steps #45 through #48 to be described later. At this step #40, the state of the light measuring switch S1 is judged. If it is judged that this switch S1 is closed, the process goes on to step #41; whereas, if it is judged that this switch S1 is opened, the process jumps to step #49. At step #41, the process waits until an 'L' exposure operation proceeding signal INREL is input through the input terminal PI0 from the interface circuit IF. This exposure operation proceeding signal being in the state of 'L' only in the course of the exposure operation, the completion of the exposure operation is judged at step #42 based on a level change of this signal from 'L' to 'H'. At step #43, the state of the display flag DF1 is judged. If it is judged that this flag DF1 is set, the display flags DF2 and DF3 are respectively set at step #44 for blinking the display section DS after the completion of the film winding-up operation and then the process goes on to the film winding-up routine. If the flag DF1 is reset, the process directly jumps to the film winding-up routine starting at step #43. Next, the case when it is judged at step #39 that the presently selected photography mode is the self-timer photography mode, will be described. At this time, when the shutter-release switch S2 is closed, the microcomputer MC receives the exposure operation proceeding signal from the interface circuit IF and at the same time receives the clock pulse switch signal. Then, the microcomputer MC judges this clock pulse switch signal to be a self-timer start signal at step #45 and switches the clock pulses to be input to the interface circuit IF from 1 KHz to 4 Hz and outputs the 4 Hz clock pulses to the interface circuit IF at step #47. It is to be noted that the delay circuit DL is provided forwardly of the timer TM shown in FIG. 4 for counting the 10 seconds for the self-timer in order to cancel a pulse number which is expected to occur in a delay in the course of the clock pulse switching operation from 1 KHz to 4 Hz. When the timer TM has counted up the 10 seconds, the interface circuit IF switches the clock pulse switch signal from 'L' to 'H'. Detecting this level change in the signal, the microcomputer MC checks the completion of counting-up operation by the self-timer at step #48 and then the process goes on to the flow beginning at step #40.

If it is judged at step #40 that the light measuring switch S1 is opened, this means that the process has been interrupted from proceeding to the shutter release routine. Thus, it is judged at step #49 based on the state of the clock pulse switch signal from the interface circuit IF whether the voltage boosting operation for the flash photography is needed or not. In the case of the negative judgement, the process jumps to the main routine. On the other hand, in the case of the affirmative judgment, the microcomputer MC outputs the motor stop signal at step #50 and then the process jumps to a voltage boosting control 1 routine to be described later. Also, this motor stop signal causes the interface circuit IF to immediately stop the motor M and at the same time to reset the timer TM. The film winding-up routine for permitting the motor to carry out the automatic film winding-up operation after the completion of the exposure will be described next.

At step #51, a film winding-up start subroutine is called to set winding-up flags WF1 and WF2 and to reset the BC flag CF and the winding-up proceeding flag RF3 at step #52. The flag WF1 is a count flag which is set for inhibiting the counting-up operation by the film frame counter. The flag WF2 is a film winding-up start flag which is set in response to a start of the winding-up operation. At step #52, a maximum motor drive time period is set to 3 seconds. This time period setting to 3 seconds is carried out by presetting a divider counter accommodated in the microcomputer to 6. Next, the divider interruption routine INTD for this divider counter and the switch interruption routine INTA are enabled and at the same time the blinking interruption routine INTT and the light measuring interruption routine INTP are inhibited. At step #54, the film winding-up operation is started and then the process returns to the step #56 in the film winding-up flow.

At step #56, the film winding-up subroutine is called. In this subroutine, the winding-up flag WF1 is immediately reset in the case of the absence of the film in the spool chamber side. On the other hand, if it is judged at step #57 that the film is placed in the spool chamber side and if it is judged at step #58 from a change of state of the film advance detection switch S11 that the film has been properly wound-up, a mark ▲▲ showing a film advance operation is turned on at step #59 and then the count flag WF1 is reset. Even if the film is placed in the spool chamber side, in case the film advance detection switch S11 is maintained at the closed or the opened state when a perforation of the film is broken or a further film winding-up operation is impossible because the film has been already exposed to its last frame, the process returns to the film winding-up flow with the count flag WF1 maintained at its set state.

In the proper film winding-up operation, since the winding-up operation has already started at the aforementioned step #54 and the one-frame-winding proceeding switch S9 is closed at step #62, the film winding-up subroutine is again called at step #63. At step #64, this subroutine is repeated until the closure of the one-frame-winding completion switch S10 is detected. When the switch S10 is closed due to the completion of the one-frame-winding operation, the motor stop signal is output at step #65. At step #66, the winding-up start flag WF2 is reset and then the process goes on to the film frame counter counting-up operation. When the back lid is opened or when the counting-up flag WF1 is set (i.e. the film is placed in the spool chamber side but the film has not yet been wound up), the value on the film frame counter is not counted up. In the other cases (i.e. when the film is not placed in the spool chamber side and the film has been wound up or when the film is placed in the spool chamber side and the film has been properly wound up), 1 is added to the film frame counter.

Then, after a time period (approximately 100 ms) required for immediately stopping the motor M, the value on the film frame counter is displayed and the film advance proceeding display mark 5 is turned off at step #71 and then the process goes on to the voltage boosting control 1 routine. In case the motor M is driven through a transistor-bridge circuit, for stopping the motor, a step for short-circuiting the motor by rendering two transistors on the positive terminal side conductive at the same time, a step for maintaining the short-circuited state for a time period required for stopping the motor and a step for rendering the transistors again unconductive after the above steps are necessary, for example. Also, if the film winding-up operation has not yet been completed within 3 seconds after winding-up operation of the motor M is started, the winding-up flag WF2 is reset and the BC flag CF is set in the divider interruption routine INTD which will be described later and then after the motor stop signal is output, the process goes on to the voltage boosting control 1 routine. When this motor stop signal is input to the interface circuit IF, the voltage boosting operation of the electronic flash device EF is started.

In the voltage boosting control 1 routine, at step #73, the output ports are initialized since the battery voltage varies considerably when the voltage boosting operation is started, thereby preventing erroneous signals from being input to the interface circuit IF At step #74, the divider counter is set to '8' for maintaining for 4 seconds the above erroneous signal preventing state at the initial stage of the voltage boosting operation of the electronic flash device EF. A maximum time period provided for the voltage boosting operation is approximately 14 seconds including the above 4 seconds and 10 seconds counted by the timer TM of the interface circuit IF for counting the 4 Hz clock pulses output from the microcomputer MC after the lapse of the 4 seconds. This is predetermined on the assumption that if the voltage boosting operation of the electronic flash device EF takes more than 14 seconds for its charging up to approximately 280 V it may be reasonable to judge that the batteries (e.g, two 3 V lithium batteries or four 1.5 V alkaline-manganese batteries) have now almost no residual capacity.

After the divider counter is set to '8', when the BC flag CF is set or when the blinking display flag DF3 is set, the incorporated timer is set to 0.25 second at step #79, the timer counter is set to '12' at step #80, all the interruptions are enabled at step #81 and then the process comes to halt. As the blinking interruption INTT is enabled, the film frame counter in the display section DS blinks by 2 Hz for 3 seconds in the blinking interruption flow shown in FIG. 8. As the divider interruption INTD is enabled, the time counting-up operation is started and carried out for 4 seconds in the divider interruption flow shown in FIG. 7. On the other hand, when both of the BC flag CF and the blinking display flag DF3 are reset, there is no need for the blinking display operation, thus all the interruptions except the blinking interruption INTT are enabled at step #77 and then the process comes to halt at step #78.

When the initial time period of 4 seconds in the voltage boosting control 1 routine by the divider interruption INTD has passed at step #150, the process goes on to a voltage boosting control 2 routine. In this voltage boosting control 2 routine, 4 Hz clock pulses are input to the interface circuit IF at step #83, all the interruptions except the divider interruption INTD are enabled at step #84 and then the process waits until the completion of the voltage boosting operation is detected at step #85. When the charging voltage has reached the predetermined value or when the timer TM of the interface circuit IF has counted up 10 seconds, the clock pulse switch signal is switched to 'H', which is decoded as the completion of the voltage boosting operation and then the process goes on to the main routine.

Figure 6A:
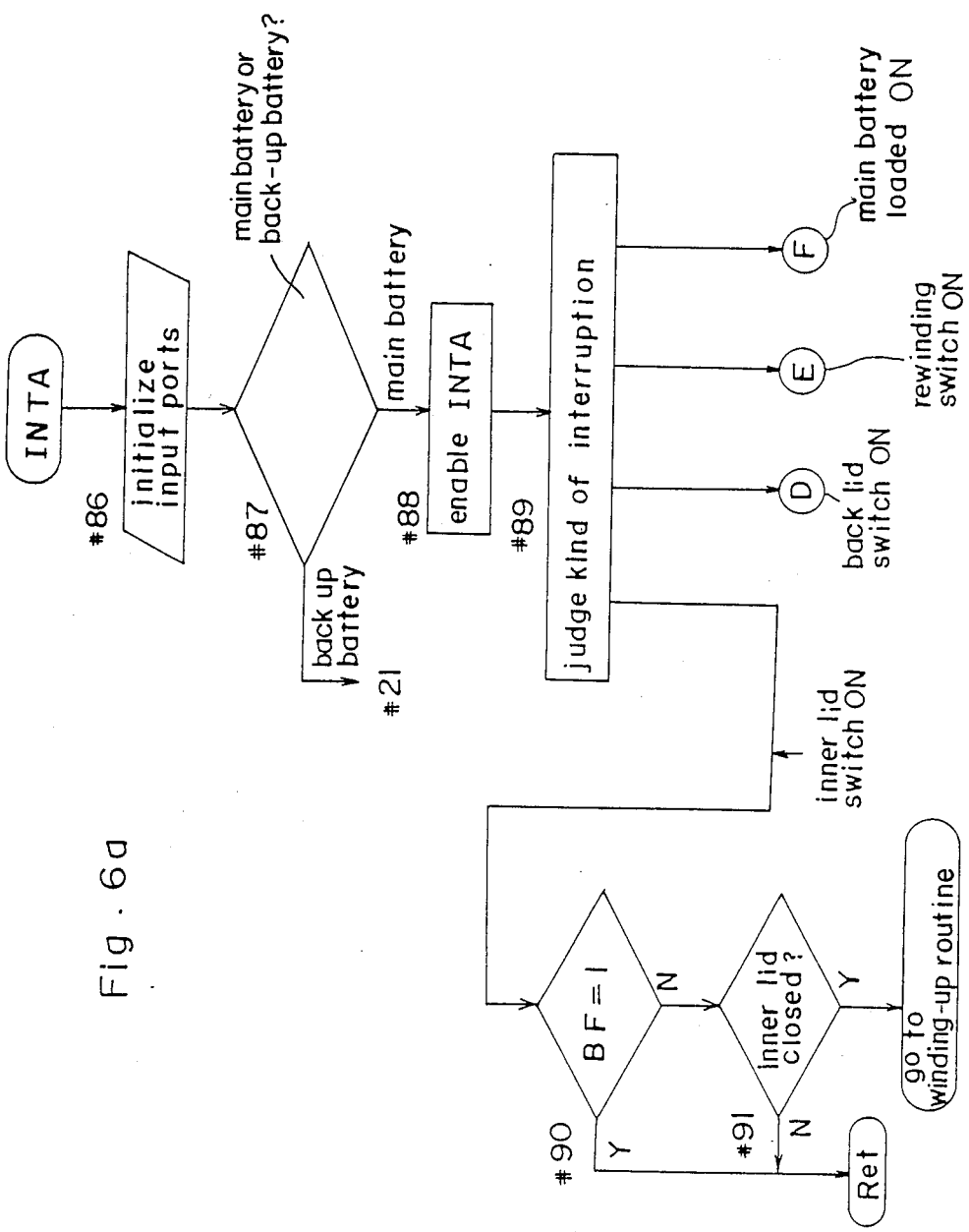
Figure 6B:
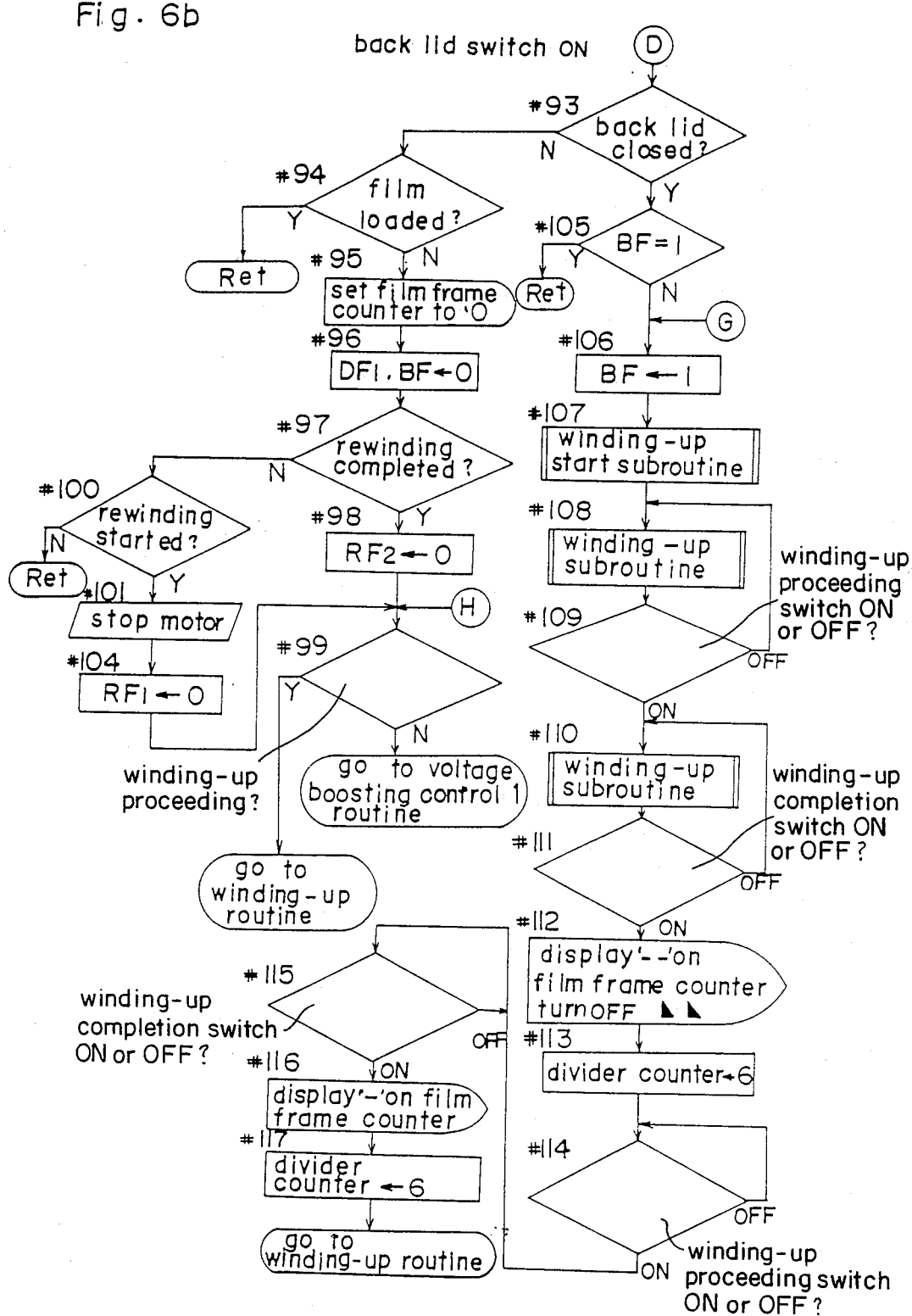
Figure 6C:
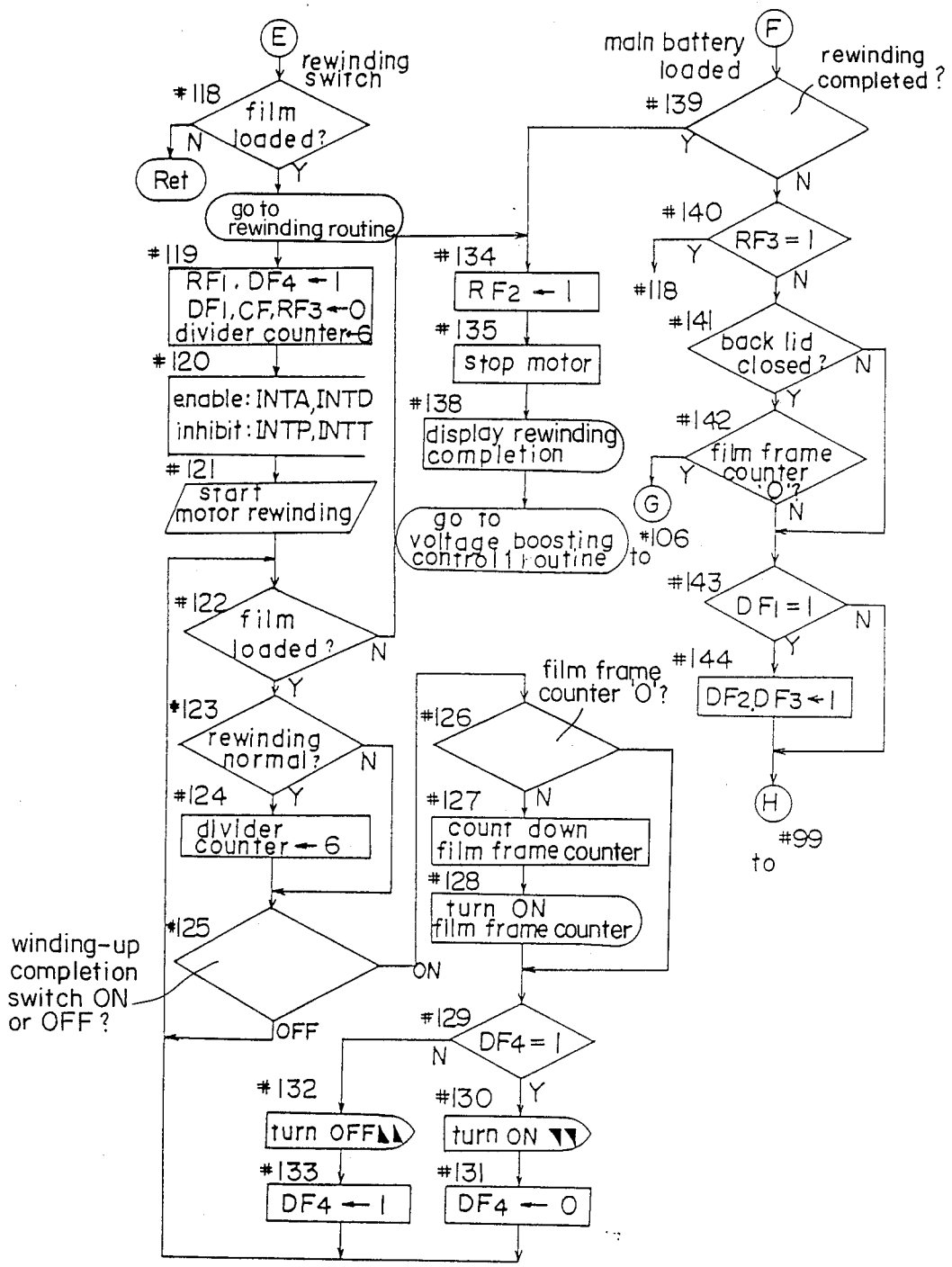
Figure 7:
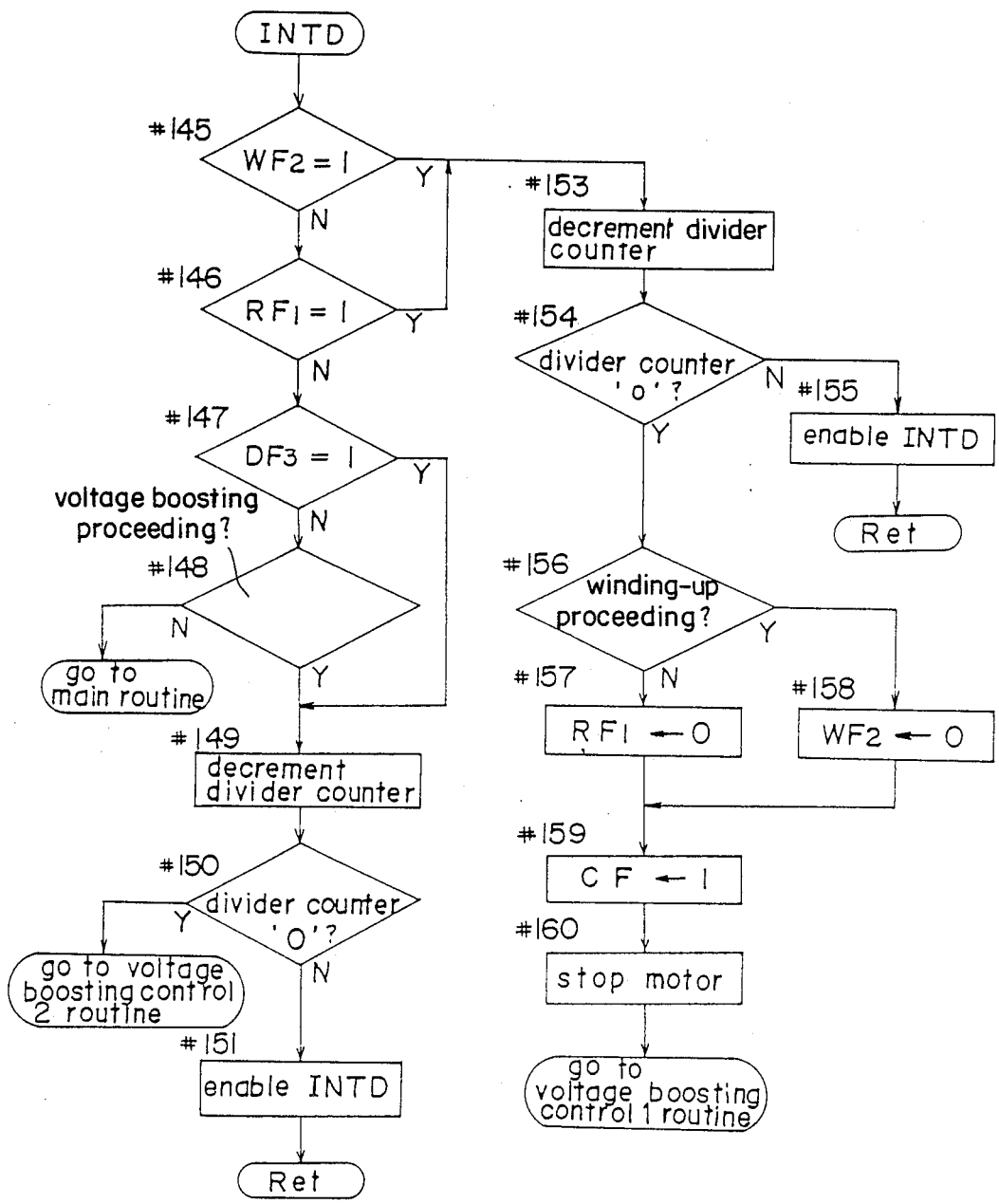
Figure 8:
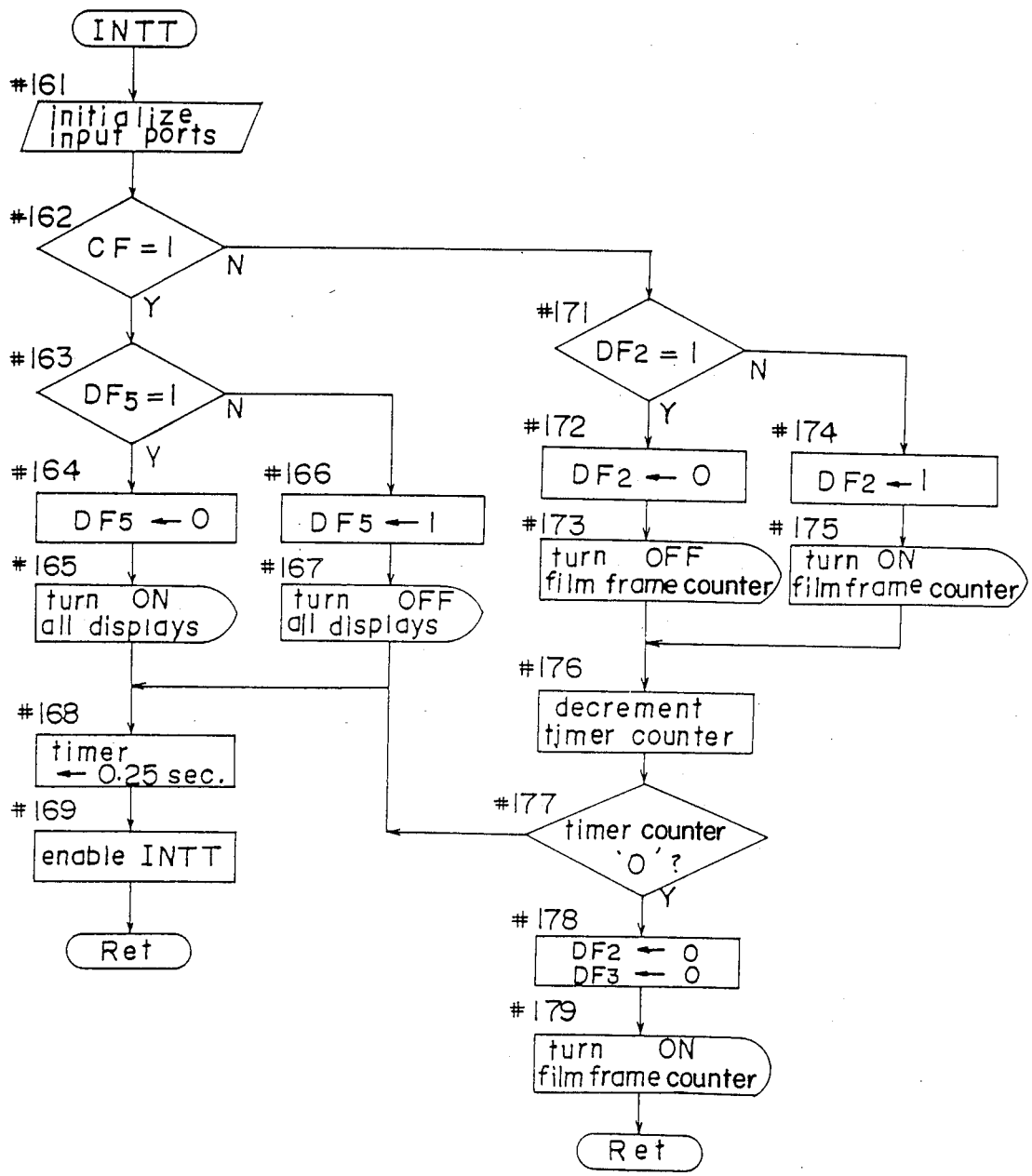

When any one of the interruption terminals INT0 through INT3 is switched as one of the switches S3 through S6 is operated, the switch interruption INTA shown in FIG. 6a takes place. At step #86, the input ports are initialized. At step #87, it is judged from the state of the main battery switch S6 whether the main battery BA is loaded or not. If it is judged that the main battery BA is not loaded, the process goes on to the aforementioned step #21. If it is judged that the main battery BA is loaded, the switch interruption INTA is enabled at step #88 and then the cause of this interruption is judged at step #89.

If it is judged that this interruption is made by the opening or the closure of the inner lid (INT1), the state of the back lid closure flag BF is judged at step #90. If it is judged that this flag BF is set, the process returns to the original flow ignoring this inner lid interruption.

The object of judging the opening or the closure of the back lid at step #90 is to detect erroneous operations of the opening and the closure of the inner lid. That is to say, originally the inner lid may be opened or closed only when the back lid is opened since the inner lid is disposed inwardly of the back lid. Further, once the inner lid is closed and then the back lid is closed, the inner lid maintains closed state unless opened together with the back lid. Therefore, if the interruption by the opening or the closure of the inner lid occurs when the back lid is closed, this means that an erroneous operation has been carried out by a movement of the inner lid (e.g. through a camera shaking as supported by hand or through a vibration of the film in the course of the winding-up or rewinding operation). It is to be noted that if the film frame counter is adapted to both count up and count down the film frame number in response to an advance of the film, it may be judged instead of the aforementioned step #90 whether the film has been wound up to the second frame at the initial film loading stage or up to the fourth frame indicated by a value '1' on the film frame counter, for instance.

In case the back lid flag BF is reset, it is judged at step #91 whether the inner lid is closed or not. If it is judged that the inner lid is closed, the inner lid film rolling-up operation is necessary, thus the process goes on to the aforementioned winding-up routine to carry out the one-frame length of the inner lid film rolling-up operation. On the other hand, if it is judged that the inner lid is opened, the process returns to the original flow.

Next will be described the case when the present interruption is made by the opening or the closure of the back lid switch S3 (INT0). At step #93, it is judged from the state of the back lid switch S3 whether the back lid is closed or not. If it is judged that the back lid is opened, it is judged at step #94 from the state of the film presence detection switch S7 whether the film is placed in the spool chamber side or not. If it is judged that the film is placed in the spool chamber side, it is determined that the back lid is erroneously opened, thus the process returns to the original flow. On the other hand, if it is judged that the film is not placed in the spool chamber side, it is determined that the film rewinding operation has been completed or that the film is to be newly loaded, thus the process carries out the operation beginning at step #95 in case the back lid is opened. More particularly, at step #95, a value '0' is displayed on the film frame counter and the display flag DF1 and the back lid closure flag BF are reset at step #96. At step #97, it is judged from the state of the rewinding completion flag RF2 whether the film rewinding operation has been completed or not. If it is judged that the film rewinding operation has been completed, the flag RF2 is reset at step #98 and then it is judged at step #99 from the state of the one-frame-winding proceeding switch S9 whether the one-frame-winding operation is presently under way or not. If it is judged that the one-frame winding-up operation is presently under way, the process goes on to the film winding-up routine; whereas, if it is judged that the one-frame winding-up operation has been already completed, the process goes on to the voltage boosting control 1 routine.

If it is judged at step #97 that the film rewinding operation has not yet been completed, this means that the back lid has been opened in the course of the rewinding operation. In this case, at step #100 the state of the rewinding start flag RF1 which is set when the rewinding operation is started is judged. If it is judged that the rewinding operation has not yet been started, the process returns to the original routine; whereas, if it is judged that the film rewinding operation has been already started, the motor M is stopped at step #103, the rewinding start flag RF1 is reset at step #104 and then the process goes on to the aforementioned step #99.

On the other hand, if it is judged at step #93 that the back lid is closed, the state of the back lid closure flag BF is judged at step #105. If it is judged that this flag is set, this means that the back lid was erroneously opened and has been again closed, thus the process returns to the original routine. If it is judged that the back lid closure flag BF is reset, it is determined that the winding-up operation is in its initial loading stage, thus the back lid closure flag BF is set thereby storing the closure of the back lid. Then, the initial loading operation of the film is started. In this case also, as in the same manner as in the normal film winding-up operation, the winding-up start subroutine is called, the relative flags are set or reset and the film winding-up operation is started through the normal rotation of the motor at step #107. At step #108, the winding-up subroutine is called until the one-frame-winding proceeding switch S9 is closed. When this switch S9 is closed, the winding-up subroutine is called until the film has been properly wound-up by one-frame length as the one-frame-winding completion switch S10 is closed. When this switch S10 is closed, at step #112 the film frame counter, which has been displaying '0', now displays a mark——— while turning off a mark ▲▲ turned on at step #59 in the winding-up subroutine. Then, the divider counter is again set to '6'(i.e. the maximum motor drive time period is set to 3 seconds) and the film winding-up operation is continued to wind-up the second-frame.

In this film winding-up operation, the winding-up subroutine is not called and the closures of the one-frame-winding proceeding switch S9 and of the one-frame-winding completion switch S10 are checked respectively at step #114 and at step #115 in the mentioned order The object of not calling the winding-up subroutine is to keep the mark ▲▲ turned off during the second-frame winding-up operation and then by intermittently turning on the same mark at the first frame and third frame winding-up operation in the film initial loading, the operator may visually confirms the three-frame-length film advance. When the closures of the one-frame-winding proceeding switch S9 and of the one-frame-winding completion switch S10 are checked, the film has been wound up by two-frame length, thus at step #116 the film frame counter, which has been displaying the mark———, now displays a mark —, and then the process goes on to step #51 of the winding-up routine thereby to carry out the winding-up operation for the third frame.

Next, the case when the switch interruption INTA has been caused by the rewinding switch S5 (INT2) will be described. At step #118, it is judged whether the film is placed in the spool chamber side or not. In the case of the negative judgement, the process returns to the original flow; whereas, in the case of the affirmative judgement, the process goes on to the rewinding routine. In this rewinding routine, at step #119, the rewinding start flag RF1 and the rewinding display flag DF4 are set, the display flag DF1, the BC flag CF and the rewinding proceeding flag RF3 are reset and the divider counter is preset to '6'. It is to be noted here that the rewinding display flag DF4 is adapted for turning on the film retreat mark ▼▼ at steps #129 through #133 which will be described later. At step #120, the divider interruption INTD and the switch interruption INTA are enabled and at the same time the blinking interruption INTT and the light measuring interruption INTP are inhibited. At step #121, a motor reverse rotation signal is output.

By this reverse rotation of the motor M, the film is rewound. The microcomputer MC judges at step #122 whether the film is placed in the spool chamber side or not, judges at step #123 the change of state of the film advance detection switch S11 and judges at step #125 the state of the one-frame-winding completion switch S10. More particularly, at step #124 the divider counter is again set to '6' each time the film advance detection switch S11 is closed or opened in the course of the film rewinding operation. When the one-frame-winding completion switch S10 is closed, this means that the film has been rewound by one-frame length, thus the process subtracts '1' from the value on the film frame counter at step #127 and then displays the value at step #128 until the value on the film frame counter becomes '0' at step #126. At the following steps #129 through #132, the state of the rewinding display flag DF4 is reversed each time one-frame-rewinding operation is completed and the film retreat mark ▼▼ indicating the film rewinding operation is turned on and off alternately according to the state of this flag DF4.

When the absence of the film is detected due to the tip of the film retreated from the spool chamber, this is decoded as a completion of the film rewinding operation, thus the rewinding completion flag RF2 is set at step #134, the motor M is stopped at step #135, the completion of the rewinding-up operation is displayed at step #138 and then the process goes on to the voltage boosting control 1 routine at step #73.

Next will be described the case when the switch interruption INTA has been caused by loading of the main battery BA. At step #139, it is judged from the state of the rewinding completion flag RF2 whether the film rewinding operation has been completed or not. In case of the affirmative judgement, the process goes on to the aforementioned step #134. On the other hand, in the case of the negative judgement, at step #140, the state of the rewinding proceeding flag RF3, which is set at step #22 when the main battery BA is unloaded in the course of the film rewinding operation, is judged. If it is judged that this flag RF3 is set, the process goes through the aforementioned step #118 then on to the rewinding-up routine; whereas, if it is judged that this flag RF3 is not set, it is judged at step #141 whether the back lid is closed or not. If it is judged that the back lid is closed and if it is judged at step #142 that the value on the film frame counter is now '0', the process jumps to step #106 to carry out the initial film loading operation.

On the other hand, if it is judged that the value on the film frame counter is not '0' or that the back lid is opened, the state of the display flag DF1 is judged at step #143. If it is judged that this flag DF1 is set, the flags DF2 and DF3 are respectively set at step #144; whereas, if it is judged that this flag is reset, the process goes on to the aforementioned step #99.

It is to be noted that the above-described switch interruptions are carried out in the order of the judgement of the inner lid, the judgement of the back lid, the judgement of the rewinding operation and then the judgement of the presence of the battery.

In the embodiment hereinbefore described, the opening or the closure of the back lid is judged from the state of the switch S3 which is operatively connected to the mechanism for opening and closing the back lid. In place of this, it is possible to adapt the switch per se to directly detect the state of the back lid. This back lid condition detection switch is turned on and off in response to the erroneous operation caused by the the camera shaking, or by the advance of the film such as the film winding-up and the film rewinding. For instance, the back lid is closed with the closure of this switch and is opened with the opening thereof.

The divider interruption routine INTD is executed with a time lapse of every 0.5 second. In this interruption routine, the 4 seconds for the initial stage of the voltage boosting operation and the 3 seconds for the maximum motor drive time period are counted up. If it is judged at steps #145 and #146 that the process is now neither in the film winding-up operation nor in the film rewinding operation as both of the winding-up start flag WF2 and the rewinding start flag RF1 are reset (i.e. the process is now in the voltage boosting operation), the state of the blinking display flag DF3 is judged at step #147. If it is judged that this flag DF3 is reset, i.e. there is no need for the blinking display operation, it is judged at step #148 from the state of the clock pulse switch signal whether the electronic flash device is now carrying out its voltage boosting operation or not. If it is judged that the voltage boosting operation has been completed, the process goes on to the main routine. On the other hand, if it is judged that the voltage boosting operation is now under way, the divider counter is decremented at step #149 in the same manner as the blinking display operation is needed as the flag DF3 is set. If it is judged that the value on the divider counter is decremented to '0' (i.e. the 4 seconds has been already counted up), the process goes on to the voltage boosting control 2 routine at step #150; whereas, if the value on the divider counter is still more than '0', the divider interruption is enabled at step #151 and then the process returns to the original flow.

On the other hand, if it is judged that the process is now in either the film winding-up or the film rewinding operation as either of the flag winding-up start flag WF2 or the rewinding start flag RF1 is set, the divider is decremented at step #153. If the value on the divider counter is more than '0', at step #155 the process returns to the original flow after enabling the divider interruption INTD. When the maximum motor drive time period of 3 seconds have passed and the divider counter is decremented to '0', after resetting the winding-up start flag WF2 in the winding-up operation or resetting the rewinding start flag RF1 in the rewinding operation, the BC flag CF is set at step #159. By setting the BC flag CF, it is stored that the winding-up or the rewinding-up operation has taken more than 3 seconds, i.e. the battery voltage has been reduced below the predetermined value. Next, at step #160, the motor M is stopped and then the process goes on to the voltage boosting control 1 routine.

In the blinking interruption routine INTT, all the display marks in case of the battery voltage from the main battery BA being reduced below the predetermined value and the display for the film frame counter in case of the blinking display flag DF3 being set are blinked. This blinking interruption takes place every time the incorporated timer has counted up 0.25 second and the input ports are initialized at step #161 and the state of the BC flag CF is judged at step #162. If it is judged that the BC flag CF is set, the state of an all display flag DF5 is reversed each time this blinking interruption takes place whereby all the display marks of the display section DS are turned on and off repeatedly at steps #163 through #167 At step #168, the incorporated timer is set to 0.25 second and the blinking interruption is enabled at step #169 and then the process returns to the original flow.

The blinking of the film frame counter is carried out as follows. If it is judged at step #162 that the BC flag CF is not set, the state of the display flag DF2 is reversed each time this blinking interruption takes place and the film frame counter of the display section DS is turned on and off repeatedly at steps #171 through #175. Then, the timer counter is decremented at step #176. If it is judged at step #177 that the timer counter is equal to '0', the blinking flag DF3 is reset at step #178, the film frame counter is turned on at step #179 and then the process returns to the original flow. If it is judged at step #177 that the timer counter is more than '0', the process goes on to the aforementioned step #168 to continue the blinking operation.

The principles, preferred embodiments and modes of operation of the present invention have been described in the foregoing specification. The invention which is intended to be protected herein, however, is not to be construed as being limited to the particular forms disclosed, since these are to be regarded as illustrative rather than restrictive. Variations and changes may be made by those skilled in the art without departing from the spirit of the invention.

We claim:

1. An electronic circuitry for a photographic camera, comprising:

functioning circuit means for carrying out various functions of said photographic camera;

an electronic flash circuit including at least a voltage boosting circuit and a capacitor which charges the output of said voltage boosting circuit for flashing;

a control circuit for controlling the operations of said functioning circuit means and outputting control signals to said functioning circuit means;

power supply means for commonly supplying power to said functioning circuit means, said electronic flash circuit and said control circuit, the power supply voltage of said power supply means being subject to transient fluctuations at a start of a voltage boosting operation of said voltage boosting circuit; and time measuring means for starting a time measuring operation in accordance with a start of voltage boosting operation of said electronic flash circuit and for outputting a time-up signal to said control circuit after a predetermined time lapse sufficient for the power supply voltage of said power supply means to reach a steady state after the start of the voltage boosting operation, wherein said control circuit inhibits the output of the control signals to said functioning circuit means until receiving the time-up signal from said time measuring means after said electronic flash circuit starts the voltage boosting operations.

2. An electronic circuit, as defined in claim 1, wherein said control circuit comprises a microcomputer.

3. An electronic circuitry for a photographic camera, comprising:

functioning circuit means for carrying out various functions of said photographic camera;

an electronic flash circuit including at least a voltage boosting circuit and a capacitor which charges the output of said voltage boosting circuit for flashing;

a control circuit for controlling the operations of said functioning circuit means and outputting control signals to said functioning circuit means;

detecting means for detecting the charged voltage of said capacitor and outputting a charge completion signal when the charged voltage reaches a predetermined voltage sufficient for flashing;

power supply means for commonly supplying power to said functioning circuit means, said electronic flash circuit and said control circuit, a power supply voltage of said power supply means being subject to transient fluctuations at a start of a voltage boosting operation of said voltage boosting circuit; and time measuring means for starting a time measuring operation in accordance with a start of voltage boosting operation of said electronic flash circuit and for outputting a time-up signal to said control circuit after a predetermined time lapse sufficient for the power supply voltage of said power supply means to reach a steady state after the start of the voltage boosting operation;

wherein said control circuit inhibits the output of the control signals to said functioning circuit means until receiving one of the charging completion signal from said detecting means and the time-up signal from said time measuring means after said electronic flash circuit starts the voltage boosting operations.

* * * * *